H. F. SMITH.
PURIFICATION OF GAS.
APPLICATION FILED OCT. 12, 1912.
1,140,198.
Patented May 18, 1915.
2 SHEETS—SHEET 1.
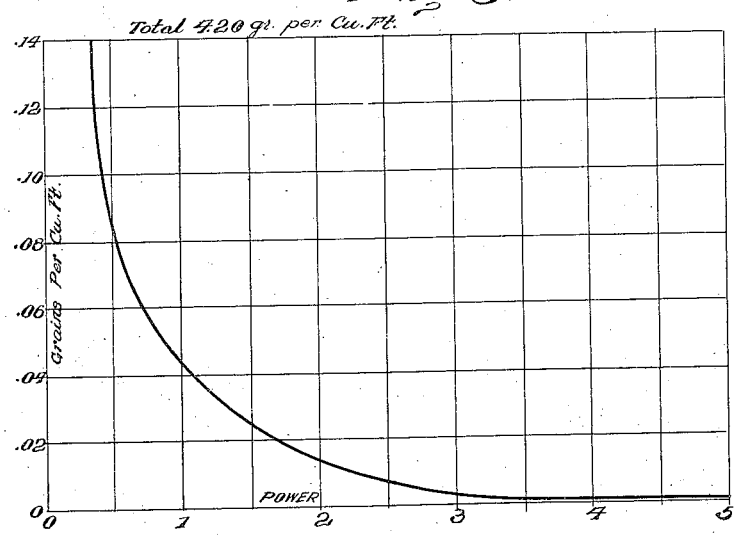
Fig. 3.
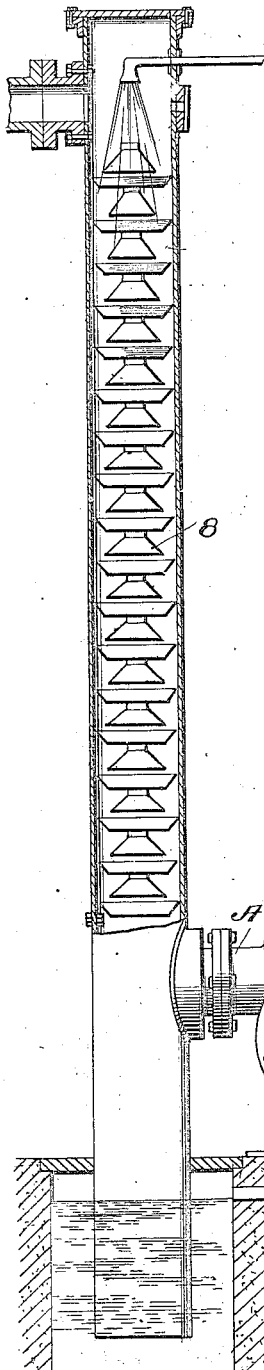
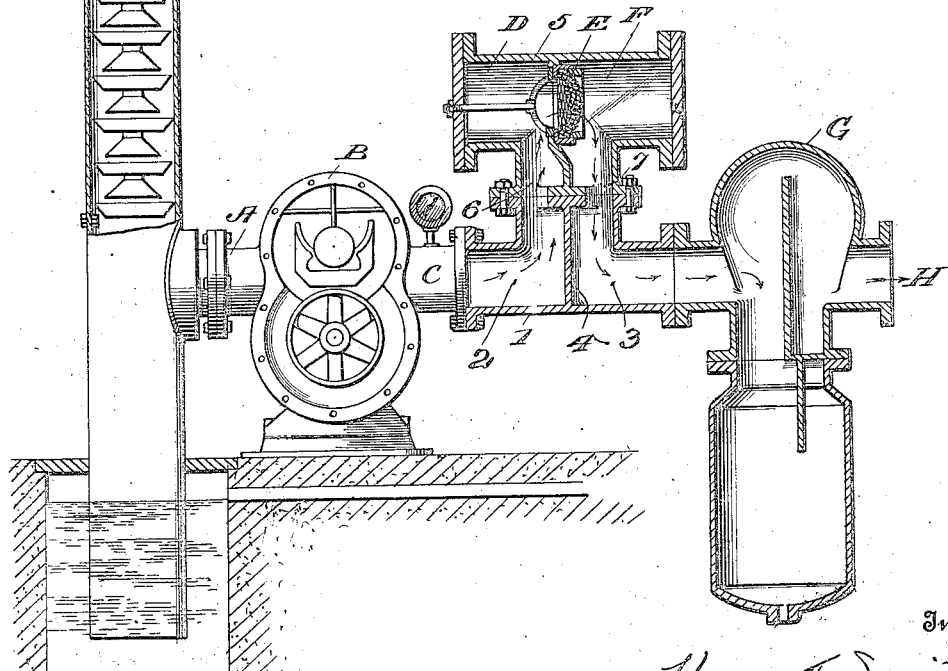
Fig. 1.
Witnesses
W. A. Williams
R. C. Braddock.
Inventor
Harry F. Smith
By Louis Baggett
Attorneys

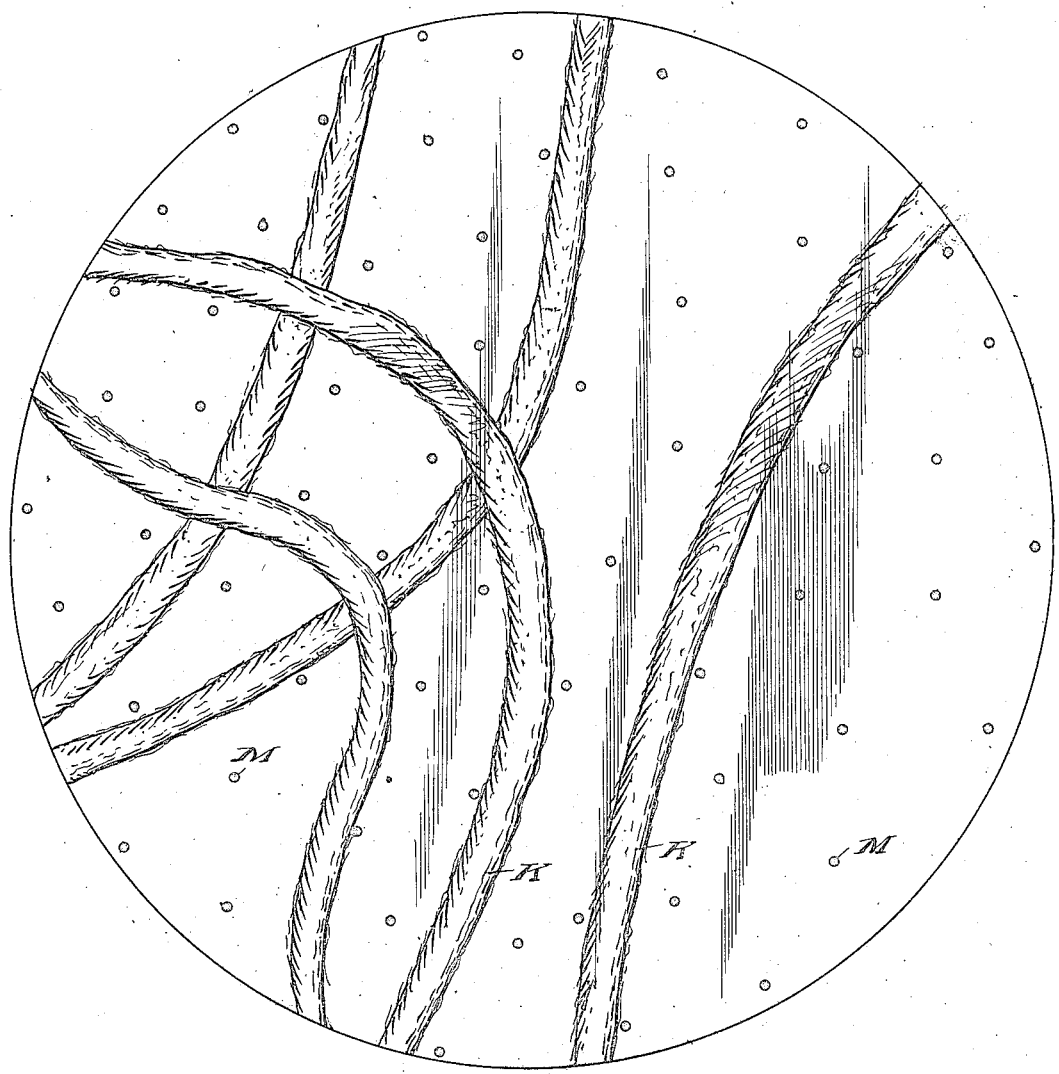

UNITED STATES PATENT OFFICE.

HARRY FORD SMITH, OF LEXINGTON, OHIO.

PURIFICATION OF GAS.

1,140,198.　　　　　Specification of Letters Patent.　　Patented May 18, 1915.

Application filed October 12, 1912. Serial No. 725,444.

*To all whom it may concern:*

Be it known that I, HARRY F. SMITH, a citizen of the United States, residing at Lexington, in county of Richland and State of Ohio, have invented certain new and useful Improvements in the Purification of Gas, of which the following is a specification.

This invention relates to an improvement in the purification of gas, and the object is to pass the gas through a porous diaphragm under suitable pressure so that the particles, such as tar, will come in contact with the diaphragm and be caused to coalesce and precipitate. It is the removal of the small particles of tar vapor or fog that constitutes the principal difficulty in connection with cleaning gas. These small tar particles are approximately 1/10,000 of an inch in diameter and in unclean producer gas there may exist from ten to twenty millions of these small particles per cubic inch. The particles are so small that they are carried in suspension in the gas current for an indefinite period and will separate out of the gas with great difficulty and at extremely slow rates.

Now the objects of the porous diaphragm which constitutes the active element of this invention is not to remove the tar from the gas, but to bring about such a combination and agglomeration of the extremely small tar particles that they will then be too large to be carried forward by the gas current and will be dropped out and separated from the gas very readily by gravitation or by any of the ordinary processes employed for separating suspended liquids from gas. This porous diaphragm does not act after the manner of a filter because a filter entraps and retains the particles, whereas the object of this diaphragm is to cause the coalescence of the particles contained or carried by the gas so that after the particles coalesce and are increased in size, due to the coalescence and agglomeration, they will be carried through the porous diaphragm by the velocity of the gas passing through the diaphragm, and as the particles have now become heavier than the gas, due to their increased size, they will drop out by gravity and separate themselves from the gas.

In the accompanying drawings—Figure 1 discloses an apparatus which may be used in carrying out this invention, although I do not wish to limit myself to the exact type of apparatus herein disclosed; Fig. 2 is an enlarged view of one of a series of planes of the porous diaphragm; Fig. 3 is a diagram or chart showing a quantity of unseparated material remaining in the gas after it has passed through the porous diaphragm under different velocities.

Referring to Fig. 1 of the drawings, A represents the gas inlet to a gas pump B which pump can be of any description that would deliver the gas under pressure, and C is an outlet or discharge pipe connected to the pump. The gas is delivered from the pump through the pipe C to a casing 1 and into chamber 2 of the casing. The casing 1 is provided with two chambers 2 and 3 which are separated by a partition 4. A casing 5 is mounted upon the casing 1 and has communication therewith by ports 6 and 7 formed in the casings 1 and 5. The gas passes from the chamber 2 of the casing 1 into chamber D of the casing 5 and thence through the porous diaphragm E which is mounted in the casing 5. The gas passing through the diaphragm E passes into chamber F on the opposite side of the diaphragm and thence through the port 7 into chamber 3 of the casing 1. A separator G is connected to the casing 1 and is in communication with the chamber 3 of the casing 1 and from the separator G the gas is discharged through an outlet opening H.

The gas, before it is admitted to the pump B, is generally cooled, passing through a cooling chamber 8, and from the cooler the gas is admitted to the pump. In cooling gas containing tar the tar vapors are condensed in several different forms. A portion of the tar vapor is condensed directly on the surface of the cooling chamber, but a part is condensed throughout the volume of the gas in the form of a fine mist or tar fog. It is not, however, essential that the gas should be entirely cold, since good results can be obtained when the gas is fed to the apparatus at temperatures that are considerably above the ordinary atmospheric temperature. After the gas has been cooled to cause condensation of the tarry vapors, it is pumped by the pump B to the chamber D of the casing 5 under the proper pressure so that the gas will pass through the diaphragm E. The diaphragm E is made up of a series of layers of fibrous or filamentous material such as spun glass, known as glass wool, wool felt, silk, and the like. Sand, that is, coarse sand, and metal screens or wiring can be used when made of proper size, but I prefer to use spun glass or glass wool.

In Fig. 2 of the drawings, K, K, represent the highly magnified fiber of spun glass constituting the screen. The small dots M represent the size of the tar particles in the gas and their relative distance from one another. The enlarged drawing of course merely represents one plane of the screen. The screen or diaphragm is made up of a series of planes. The porous diaphragm is preferably made ⅜ of an inch thick, although the thickness of the diaphragm under some conditions will vary. The fibers of this material are sufficiently stiff and elastic to retain their shape under the pressures required and since the glass is entirely indifferent to the action of moisture or chemicals, the strength and resistance of the porous diaphragm is not impaired through the absorption of moisture or the deleterious action of chemical constituents in the gas or tar handled. I preferably inclose the glass wool in the form of a uniformly distributed sheet or layer between two fairly coarse wire screens. In this way the glass is supported at many points so that its shape is not changed by the pressures that are brought to bear upon it. I of course do not wish to be limited to this material or to this arrangement or construction, as it is obvious that many forms of apparatus might be employed to embody this same principle.

From Fig. 2 a very good idea is given of the relative size of the material constituting the porous diaphragm and of the tar particles that are to be removed from the gas and of the spaces between the fibers as they actually lie in the porous diaphragm. Furthermore, the openings between the fibers are so large that a filtering action in the ordinary sense, cannot occur. In other words, the tar particles could easily float through the openings without becoming enmeshed in the fibers of the diaphragm. This drawing is magnified approximately 600 diameters or three hundred and sixty thousand times that of the actual materials. The result to be obtained by this invention is therefore dependent upon the pervious diaphragm together with the high velocity at which the gas passes through the minute openings in the diaphragm.

As stated before, the fiber of the diaphragm is matted together in the form of a disk approximately three-eighths of an inch in thickness and having a sectional area of about one square inch for each 400 cubic feet per hour of gas which it is desired to clean. The area of the diaphragm must be small enough that when the gas is flowing through, a difference in pressure of from one to five pounds shall be maintained across the diaphragm. The gas is much more completely purified when passing through under a difference of pressure of five pounds than when passing through with a difference of pressure of one pound. The precipitation of the small tar particles is the result of their direct collision with the fine fibrous material through which the gas is driven at high velocity. Such collision could not occur with any great effectiveness if the dimensions of the obstructing material were large with respect to the dimensions of the tar particles. To illustrate my meaning, it has often been proposed to project small streams of gas against baffles, diaphragms and the like, whereby a sudden change in the direction of the flow of gas is produced and the tar particles thereby caused to collide violently with the baffles and to be precipitated thereby. Action of this character is imperfect for the reason that an obstruction of any considerable dimensions would carry ahead of it a cushion of compressed gas which would tend to prevent an actual collison between the approaching tar particles and the surface of the baffle. Many of the tar particles would be shielded off and gradually turned aside by the action of this gas cushion.

Now, with this diaphragm of the present invention, the dimensions of the opposing bodies are so small that no shielding action is exerted and the tar particles which move forward at high velocity are thrown into direct collision with the fine threads and fibers of the porous diaphragm. The greater the velocity with which these collisions occur the greater will be the effectiveness of the action, and further the filamentous material or fibers against which the tar particles are projected should be of very small dimensions so that there is no possibility of the shielding effect being given to the tar particles when they come in contact with the filamentous material. If the action of the porous diaphragm was the same as the ordinary filter, the diaphragm would become clogged with the accumulated material and would soon become inoperative. It is characteristic of a filter that for its effective and successful operation the currents passing through the filter should travel at slow rates so as to give ample opportunity for the materials that are to be separated to become entrapped in the fibers of the filter. Now, with this particular invention, the use of a filter would fail to give the results, as it has been found that when the gas passes through the diaphragm E at a slow rate, practically no separation of the tar particles from the gas takes place. The separation is only effected when the gas to be cleaned is forced through the porous diaphragm at high velocities such as would be produced by the application of considerable pressure to the face side of the diaphragm.

From the chart shown in Fig. 3 the figures on the horizontal line at the bottom give pressure in pounds; the figures on the vertical line at the left give grains of impurities per cubic foot remaining in the gas. It is accordingly seen with below one-half pound pressure the cleaning is very ineffective, and for exceedingly thorough work from four to five pounds pressure is required. These facts differentiate this invention from filtering, since in filtering the solid material is completely removed due to slow rates of travel, and the slower the rates of travel the more effective the cleaning, while with this invention, the higher the velocities the more effective the cleaning. This curve or diagram is of course accurate only for the particular conditions that surrounded the test in question, but they will serve to show the fact that increase in the velocity of gas flow through the diaphragm E results in an increase of the cleanness of the gas.

The separator G is an ordinary steam separator such as is used for separating entrained moisture from steam. In this instance, however, it is intended to cause the final precipitation of all of the particles of tar after they have passed the porous diaphragm E. It is not necessary to use this apparatus as the tar particles are so heavy that they will drop out of the gas current.

The practical advantages resulting from this invention are many. The first and most important of these is the fact that by this invention it is possible to secure a much greater degree of cleanness in the treatment of the gas than has been possible to secure heretofore. In the second place, the apparatus employed is simple in construction and does not require rapidly rotating parts such as is customary in the centrifugal type of tar extractor. Furthermore, water is not required except for the purpose of cooling the gas and even this is not absolutely essential as the gas can be cooled by air condensers or other means.

Having thus described my invention, what I claim as new and desire to secure by Letters Patent is—

1. The herein described process of removing tar particles and the like from gas which consists in passing the gas through a pervious medium causing the particles of tar to coalesce and the coalesced particles of tar being separated from the pervious medium by the flowing gas.

2. The herein described process of removing tar particles and the like from gas which consists in passing the gas through a pervious medium causing the particles of tar to coalesce and the coalesced particles of tar being separated from the pervious medium by the flowing gas, and separating the coalesced particles of tar from the gas.

3. The herein described process of removing tar particles and the like from gas which consists in passing the gas through a pervious medium causing the particles of tar to coalesce and the coalesced particles of tar being separated from the pervious medium by the flowing gas, and separating the coalesced particles of tar from the gas by gravity.

4. The herein described process of removing tar particles and the like from gas which consists in passing the gas through a pervious medium causing the particles of tar to coalesce and the coalesced particles of tar being separated from the pervious medium by the flowing gas, and separating the coalesced particles of tar from the gas by inertia.

5. The herein described process of removing tar particles and the like from gas which consists in obstructing the particles whereby they are made to coalesce and the coalesced particles being carried beyond the obstruction by the gas.

6. The herein described process of removing tar particles and the like from gas consisting in passing the gas through a pervious medium causing the tar particles to collide with the pervious medium and precipitate thereon producing a coalescence of the small particles of tar into large particles and the large particles being carried through the pervious medium by the gas.

7. The herein described process of removing tar particles from gas which consists in passing the gas through a pervious diaphragm at a high velocity, and the openings of the diaphragm being sufficiently large to permit the gas and all impurities to pass therethrough, and the tar particles carried by the gas as it passes through the pervious diaphragm being caused to collide with the diaphragm creating a coalescence of the tar particles upon the diaphragm forming large tar particles, which large tar particles are dislodged and carried through the pervious diaphragm by the gas.

8. The herein described process of removing tar particles from gas which consists in passing the gas through a pervious diaphragm at a high velocity, and the openings of the diaphragm being sufficiently large to permit the gas and all impurities to pass therethrough; and the tar particles carried by the gas as it passes through the pervious diaphragm being caused to collide with the diaphragm creating a coalescence of the tar particles upon the diaphragm forming large tar particles, which large tar particles are dislodged and carried through the pervious diaphragm by the gas, and separating the coalesced tar particles from the gas.

9. The herein described process of removing tar particles from gas consisting in passing the gas through a pervious diaphragm at a high velocity, causing the tar particles to collide with the pervious diaphragm and temporarily lodge thereupon during the coalescence and accumulation of the small particles upon the diaphragm, and then the accumulated particles are dislodged from the diaphragm by the flowing gas.

10. The herein described process of removing tar particles from gas consisting in passing the gas at a high velocity through a pervious filamentous diaphragm and causing the tar particles to collide with the filamentous material and form a fluid film upon and between the filaments of the diaphragm thereby producing the coalescence and accumulation of the tar particles, which accumulated tar particles are dislodged from the diaphragm by the flowing gas and which particles fall from the gas by gravity.

11. The herein described process of removing tar particles from gas which consists in passing the gas through a pervious diaphragm at a high velocity, the area of the diaphragm being small enough so that when the gas passes through the diaphragm there will be a sufficient pressure maintained across the diaphragm for causing the particles carried by the gas to collide with the pervious diaphragm and coalesce thereon and the accumulated particles on the diaphragm being dislodged therefrom by the gas current.

12. The herein described process of removing tar particles from gas which consists in passing the gas through a pervious diaphragm at a high velocity, the area of the diaphragm being small enough so that when the gas passes through the diaphragm there will be a difference in pressure of from one to five pounds maintained across the diaphragm for causing the particles carried by the gas to collide with the pervious diaphragm and coalesce thereon and the accumulated particles on the diaphragm being dislodged by the gas current.

13. The herein described process of removing tar particles from gas, consisting in cooling the gas for condensing the tar vapors, then passing the gas through a pervious medium causing the tar vapors to collide with the pervious diaphragm and coalesce thereon, and then the coalesced tar particles dislodged from the diaphragm by the flowing gas.

14. The herein-described process of removing tar and the like from gas, which consists in passing the gas through a pervious medium, so constructed and arranged that under moderate rates of flow, the tar would not be removed from the gas, but by increasing the rate of flow the particles of tar will be separated from the gas and coalesce, and then separating the tar particles from the pervious medium.

In testimony whereof I affix my signature in the presence of two witnesses.

HARRY FORD SMITH.

Witnesses:
ANNA R. EARHART,
WM. H. EARHART.